United States Patent
Egoshi

(10) Patent No.: US 9,165,264 B2
(45) Date of Patent: Oct. 20, 2015

(54) RESERVATION SYSTEM, NAVIGATION DEVICE, BATTERY CHARGER AND SERVER

(71) Applicant: Clarion Co., Ltd., Saitama-shi, Saitama (JP)

(72) Inventor: Yasuo Egoshi, Kanagawa (JP)

(73) Assignee: Clarion Co., Ltd., Saitama-shi (JP)

( * ) Notice: Subject to any disclaimer, the term of this patent is extended or adjusted under 35 U.S.C. 154(b) by 307 days.

(21) Appl. No.: 13/743,376

(22) Filed: Jan. 17, 2013

(65) Prior Publication Data
US 2013/0181672 A1 Jul. 18, 2013

(30) Foreign Application Priority Data
Jan. 18, 2012 (JP) .................. 2012-008228

(51) Int. Cl.
*H02J 7/00* (2006.01)
*G06Q 10/02* (2012.01)
*B60L 11/18* (2006.01)

(52) U.S. Cl.
CPC ............ *G06Q 10/02* (2013.01); *B60L 11/1848* (2013.01); *H02J 7/0052* (2013.01); *B60L 2240/62* (2013.01); *Y02T 10/7005* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01)

(58) Field of Classification Search
CPC ............ B60L 11/1848; B60L 11/1861; B60L 11/1862; B60L 1/08; B60L 2240/80; G06Q 10/02; Y02T 10/7005; Y02T 90/125; H02J 7/0052
USPC .................................................. 320/101, 109
See application file for complete search history.

(56) References Cited

U.S. PATENT DOCUMENTS

2012/0161692 A1* 6/2012 Kobayashi et al. ........... 320/101

FOREIGN PATENT DOCUMENTS

JP 2010-230615 A 10/2010

* cited by examiner

*Primary Examiner* — Vuthe Siek
(74) *Attorney, Agent, or Firm* — Crowell & Moring LLP

(57) ABSTRACT

Reservation system realizing more efficient reservation of charging. The reservation system comprises a navigation device and a battery charger. The navigation device generates reservation information of a charge, and sends the reservation information to the battery charger. The battery charger makes a schedule by using the reservation information, and performs charging according to the schedule. Further, the battery charger makes again a schedule according to an arrival time of a booked vehicle.

8 Claims, 21 Drawing Sheets

(a) Reservation Table 700

| Reservation ID | Reservation Acceptance Time | Estimated Arrival Time | Finish Time | Charge Time | Priority |
|---|---|---|---|---|---|
| A | 10:23 | 14:15 | 15:45 | 45minutes | 1 |
| B | 11:08 | 14:00 | 18:00 | 105minutes | 2 |
| C | 11:15 | 13:00 | 14:30 | 60minutes | 3 |

701, 702, 703, 704, 705, 706

Generation of Schedule (Step S023)

(b) Schedule 710

| Reservation ID | Reservation Time | Charge Time |
|---|---|---|
| C | 13:00~14:00 | 60minutes |
| B | 14:00~14:15 | 15minutes |
| A | 14:15~15:00 | 45minutes |
| B | 15:00~16:30 | 90minutes |

711, 712, 713

Reschedule at Arrival of C

| Reservation ID (711) | Reservation Time (712) | Charge Time (713) |
|---|---|---|
| C | 13:00~14:00 | 60minutes |
| B | 14:00~14:15 | 15minutes |
| A | 14:15~15:00 | 45minutes |
| B | 15:00~16:30 | 90minutes |

710

| Reservation ID (721) | Reservation Time (722) | Charge Time (723) |
|---|---|---|
| C | 12:30~13:30 | 60minutes |
| B | 14:00~14:15 | 15minutes |
| A | 14:15~15:00 | 45minutes |
| B | 15:00~16:30 | 90minutes |

Rescheduling at Arrival of B

| Reservation ID (721) | Reservation Time (722) | Charge Time (723) |
|---|---|---|
| C | 12:30〜13:30 | 60minutes |
| B | 14:00〜14:15 | 15minutes |
| A | 14:15〜15:00 | 45minutes |
| B | 15:00〜16:30 | 90minutes |

720

⬇

| Reservation ID (731) | Reservation Time (732) | Charge Time (733) |
|---|---|---|
| C | 12:30〜13:30 | 60minutes |
| B | 13:30〜14:15 | 45minutes |
| A | 14:15〜15:00 | 45minutes |
| B | 15:00〜16:00 | 60minutes |

730

Rescheduling at Arrival of A

RESERVATION SYSTEM, NAVIGATION DEVICE, BATTERY CHARGER AND SERVER

The present application claims the priority of Japanese Application No. 2012-008228 filed on Jan. 18, 2012, the content of which is incorporated herein by reference.

The present invention relates to a reservation system, a navigation device, a battery charger and a server.

BACKGROUND OF THE INVENTION

Patent Document 1 discloses a technique relating to a reservation system for efficiently operating a charging station.
Patent Document 1: Japanese Un-examined Patent Application Laid-Open No. 2010-230615

SUMMARY OF THE INVENTION

According to the reservation system disclosed in the above document, when an arrival time is largely different from the estimated time of arrival, the reservation is changed or canceled. However, it seems unfair that the reservation is changed or canceled on account of a delay in an arrival time even if the reservation has been made early. On the other hand, if a reservation system can flexibly change its reservation schedule according to an arrival time without entailing a change or a cancellation, a battery charger in a charging station can be used efficiently and a sense of unfairness is not caused.

Thus, an object of the present invention is to provide a reservation system that allows more efficient reservation for charging.

To solve the above problems, a reservation system of the present invention comprises: a navigation device, which generates reservation information of a charge, and sends the reservation information to a battery charger; and the battery charger, which generates a schedule by using the reservation information, and performs charging according to the schedule; and the battery charger generates again a schedule according to an arrival time of a booked vehicle.

The reservation system of the present invention can realize more efficient reservation of charging.

BRIEF DESCRIPTION OF THE DRAWINGS

FIG. 16 is a diagram showing rescheduling of booked vehicles according to an embodiment of the present invention.

DETAILED DESCRIPTION

Now, a reservation system according to an embodiment of the present invention will be described.

Figure 1:
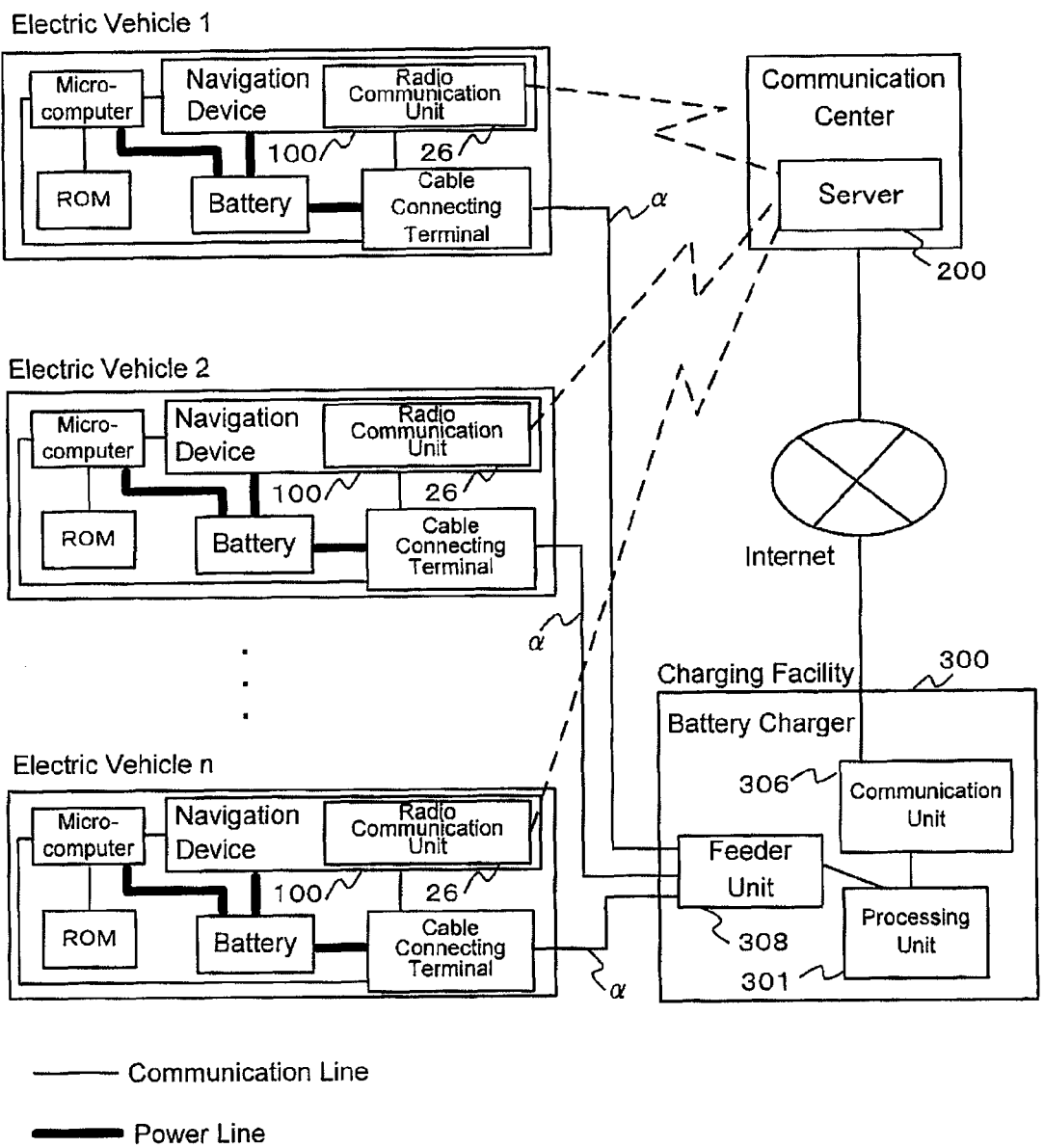
FIG. 1 is a diagram showing an outline of configuration of a reservation system according to an embodiment of the present invention.

FIG. 1 is a diagram showing an outline of configuration of a reservation system according to an embodiment of the present invention. The reservation system comprises: navigation devices 100 mounted on respective vehicles; a server 200 placed in a communication center; and a battery charger 300 placed in a charging facility. Each navigation device 100 wirelessly communicates with the server 200 through a radio communication unit 26 contained in the navigation device 100. Further, each navigation device 100 exchanges prescribed information with a microcomputer mounted on its vehicle.

The server 200 is connected to a communication unit 306 of the battery charger 300 through a digital communication network such as the Internet, in order to receive and deliver data to each other.

The battery charger 300 feeds an electric vehicle connected to a power cable α of a feeder unit 308. Further, the battery charger 300 switches the target of feeding according to a charge reservation schedule. That is to say, in the case where a plurality of electric vehicles is connected to the feeder unit 308, the battery charger 300 feeds a specific electric vehicle that is booked. An electric vehicle charges its battery by power feeding from the battery charger 300. Each power cable α contains a communication line. When a charging connector of a power cable α is connected to a cable connecting terminal of a vehicle, communication is established between the vehicle and the battery charger 300. By this, the battery charger 300 can detect that the vehicle has arrived at the charging facility.

Figure 2:
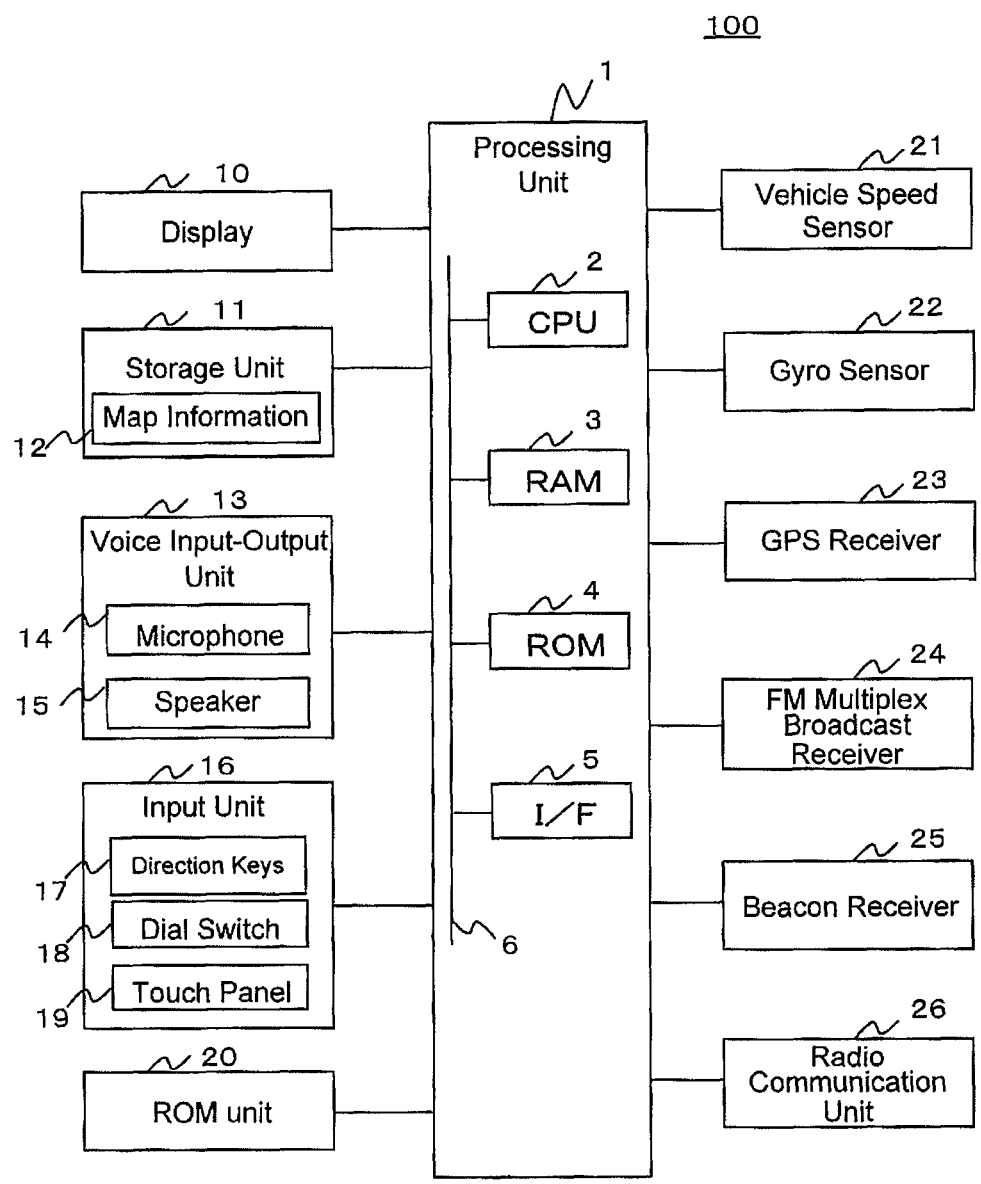
FIG. 2 is a diagram showing an outline of configuration of a navigation device according to an embodiment of the present invention.

FIG. 2 is a diagram showing an outline of configuration of each navigation device 100 according to the present embodiment. Each navigation device 100 comprises a processing unit 1, a display 10, a storage unit 11, a voice input-output unit 13, an input unit 16, a ROM unit 20, a vehicle speed sensor 21, a gyro sensor 22, a GPS receiver 23, an FM multiplex broadcast receiver 24, a beacon receiver 25, and a radio communication unit 26. These various component devices and sensors are connected with one another through a bus so that data can be received and delivered.

Here, the navigation device 100 is a device that can realize so-called navigation functions such as displaying of map information 12 and traffic information and searching for a recommended route and route guidance. The navigation device 100 of the present embodiment is used being mounted on an electric vehicle (for example, an electric automobile).

The processing unit 1 is a central unit that executes various types of processing in the navigation device 100. The processing unit 1 uses information outputted from various sensors (such as the vehicle speed sensor 21 and the gyro sensor 22) and the GPS receiver 23 and the like, in order to identify the current location of the user.

Further, the processing unit 1 uses the map information 12 stored in the storage unit 11, in order to search for a recommended route connecting a departure place and a destination.

Further, according to the identified current location and a previously-set display scale ratio, the processing unit 1 determines a display range of the map information 12 to be displayed in a display area of the display 10.

Further, the processing unit 1 performs graphic conversion of the map information 12, the traffic information and route information included in the display area, and outputs the converted information to the display 10.

Further, the processing unit 1 generates voice information for performing route guidance, and outputs the generated voice information to a speaker 15.

Further, the processing unit 1 calculates an estimated time of arrival at the charging facility and an amount of charge required for attaining full charge. Further, the processing unit 1 generates reservation information that includes prescribed pieces of information such as the estimated arrival time, the amount of charge, an appointment date of charge, a stay length.

The processing unit 1 comprises: a Central Processing Unit (CPU) 2 for executing various types of processing such as numeric operations and control of various devices and sensors; a Random Access Memory (RAM) 3 for storing temporarily programs, data, results of calculations, and the like; a Read Only Memory (ROM) 4 for storing programs, data, and the like; and an interface (I/F) 5 for connecting various hardware units to the processing unit 1. Here, the CPU 2, the RAM 3 and the ROM 4 are connected with one another through a bus 6.

The display 10 is a unit for displaying graphics information generated by the processing unit 1. The display 10 comprises, for example, a liquid crystal display, an organic EL display, or the like.

The storage unit 11 comprises a storage medium that is at least readable and writable such as, for example, a Hard Disk Drive (HDD) or a nonvolatile memory card. For example, the storage unit 11 stores information such as the map information 12.

The voice input-output unit 13 comprises a microphone 14 as a voice input unit and the speaker 15 as a voice output unit. The microphone 14 obtains sound outside the navigation device 100, such as voice coming from the user. Further, the speaker 15 outputs, as voice, a message to the user, which is generated by the processing unit 1.

The input unit 16 is a unit for the navigation device 100 to receive prescribed instructions from the user. In detail, the input unit 16 comprises direction keys 17, a dial switch 18, a touch panel 19, a scale change key as another hardware switch (not shown), and the like.

The ROM unit 20 comprises a storage medium that is at least readable, such as a Read Only Memory (ROM) (for example a CD-ROM or a DVD-ROM), an Integrated Circuit (IC) card, or the like. This storage medium stores, for example, moving image information, voice information and/or the like.

The vehicle speed sensor 21, the gyro sensor 22 and the GPS receiver 23 are used for detecting the current location of the vehicle on which the navigation device 100 is mounted.

The vehicle speed sensor 21 outputs information used for calculating a vehicle speed. In detail, the vehicle sensor 21 converts the detected number of wheel rotations into pulse signals, and outputs prescribed information such as the number of pulse signals generated in a given time.

The gyro sensor 22 comprises an optical-fiber gyroscope, a vibrational gyroscope, or the like, and detects an angular velocity due to turning of a moving body.

The GPS receiver 23 receives signals from GPS satellites and measures a distance between the vehicle and each GPS satellite and a rate of change of that distance with respect to three or more satellites, in order to measure the current location, the traveling speed and the travelling direction of the vehicle.

The FM multiplex broadcast receiver 24 receives an FM multiplex broadcast signal sent from an FM broadcast station. As FM multiplex broadcast, are mentioned general current-state traffic information, traffic regulation information, Service Area/Parking Area (SA/PA) information, parking lot information, weather information and the like of Vehicle Information Communication System (VICS, a registered trademark) and text information provided as FM multiplex general information from a radio station, for example.

The beacon receiver 25 receives general current-state traffic information, traffic regulation information, Service Area/Parking Area (SA/PA) information, parking lot information, weather information, emergency information and the like of, for example, VICS information. For example, as such a receiver, are mentioned an optical beacon communicating by light, a radio beacon communicating by radio wave, and the like.

The radio communication unit 26 is a unit for communicating wirelessly with an external device. In detail, the radio communication unit 26 sends prescribed information such as charge reservation information generated by the processing unit 1 to the server 200 of the communication center.

Figure 3:
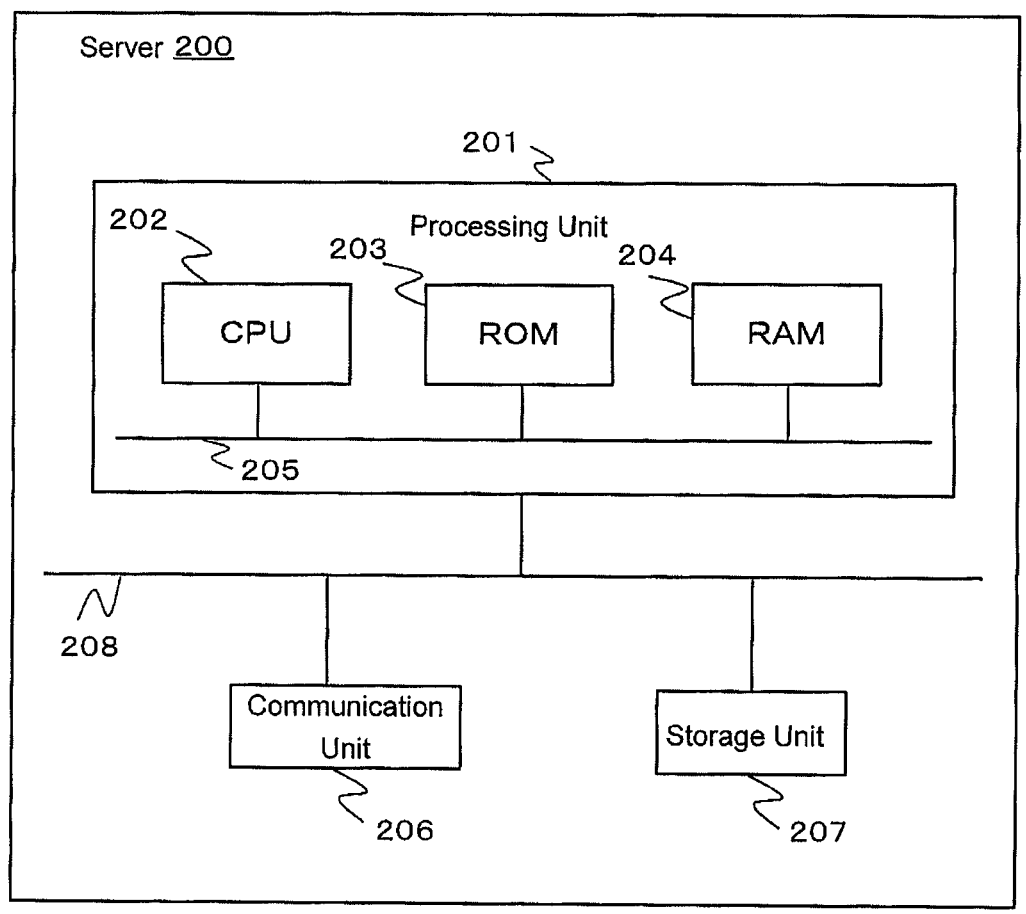
FIG. 3 is a diagram showing an outline of configuration of a server according to an embodiment of the present invention.

FIG. 3 is a diagram showing an outline of configuration of the server 200 according to the present embodiment. The server 200 comprises a processing unit 201, a communication unit 206, and a storage unit 207. These component devices are electrically connected with one another through a bus 208 so that data can be received and delivered between the devices.

The processing unit 201 is a central unit that executes various types of processing in the server 200. In detail, the processing unit 201 executes prescribed processing by using information received by the communication unit 206. Further, the processing unit 201 designates a destination of information to be sent through the communication unit 206.

The processing unit 201 comprises: a Central Processing Unit (CPU) 202 for executing various types of processing such as numeric operations and control of other devices and sensors; a Read Only Memory (ROM) 203 for storing programs, data, and the like; and a Random Access Memory (RAM) 204 for storing temporarily programs, data, results of calculations, and the like. Here, the CPU 202, the ROM 203 and the RAM 204 are electrically connected with one another through a bus 205.

The communication unit 206 is a unit that sends and receives data to and from an external device. In detail, the communication unit 206 receives reservation information from the navigation device 100, and sends the reservation information to the battery charger 300 according to an instruction from the processing unit 201. Further, the communication unit 206 receives reservation confirmation information from the battery charger 300, and sends the reservation confirmation information to the navigation device 100 according to an instruction from the processing unit 201.

The storage unit 207 comprises a storage medium that is at least readable and writable such as, for example, a Hard Disk Drive (HDD) or a nonvolatile memory card. For example, the storage unit 207 stores programs and data used for processing in the server 200. Further, the storage unit 207 stores information received by the communication unit 206, for example.

Figure 4:
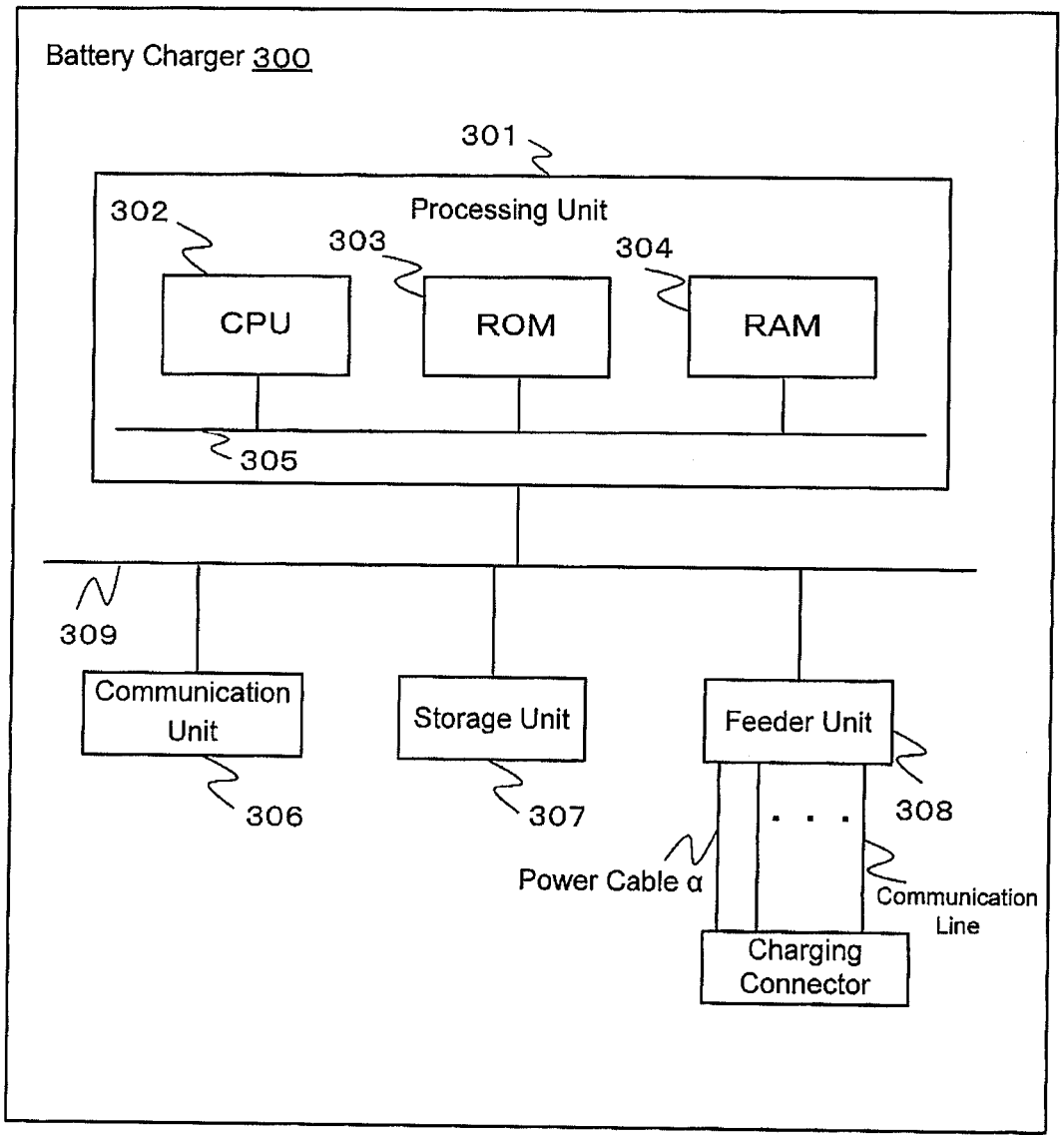
FIG. 4 is a diagram showing an outline of configuration of a battery charger according to an embodiment of the present invention.

FIG. 4 is a diagram showing an outline of configuration of the battery charger 300 according to the present embodiment. The battery charger 300 comprises a processing unit 301, a communication unit 306, a storage unit 307, and the feeder unit 308. These component devices are electrically connected with one another through a bus 309 so that data can be received and delivered between the devices.

The processing unit 301 is a central unit that executes various types of processing in the battery charger 300. In detail, the processing unit 301 obtains reservation information from navigation devices 100, and makes a charge reservation schedule and reservation confirmation information by using the obtained reservation information. Further, according to the made schedule, the processing unit 301 switches the target of feeding to a booked vehicle.

Here, the processing unit 301 comprises: a Central Processing Unit (CPU) 302 for executing various types of processing such as numeric operations and control of other devices and sensors; a Read Only Memory (ROM) 303 for storing programs and data; and a Random Access Memory (RAM) 304 for storing temporarily programs, data, results of calculations, and the like. The CPU 302, the ROM 303 and the RAM 304 are electrically connected with one another through a bus 305.

The communication unit 306 is a unit that sends and receives data to and from an external device. In detail, the communication unit 306 receives reservation information from a navigation device 100 through the server 200. Further, the communication unit 306 sends reservation confirmation information generated by the battery charger 300 to a navigation device 100 through the server 200.

The storage unit 307 comprises a storage medium that is at least readable and writable such as, for example, a Hard Disk Drive (HDD) or a nonvolatile memory card. For example, the storage unit 307 stores programs and data used for processing in the battery charger 300, and stores the charge reservation schedule and the like made in the processing unit 301.

The feeder unit 308 is a unit that charges an electric vehicle. In detail, the feeder unit 308 has a plurality of (n) power cables each containing a communication line, and supplies power to each power cable to which a booked electric vehicle is connected. The feeder unit 308 switches targets of feeding according to an instruction from the processing unit 301.

Figure 5:
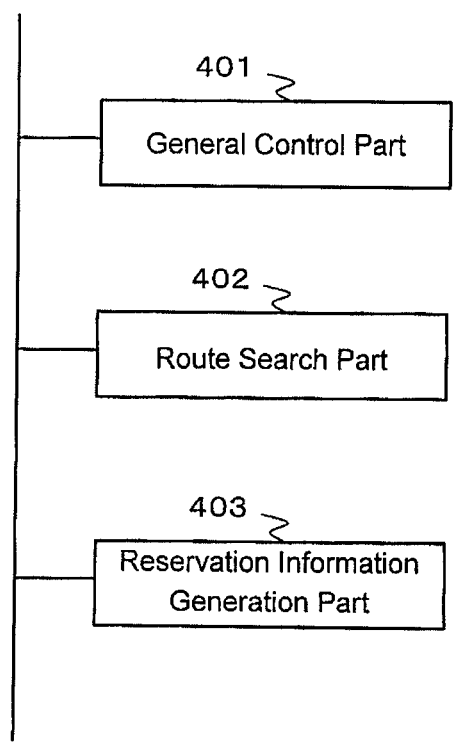
FIG. 5 is a diagram showing functional blocks of a navigation device according to an embodiment of the present invention.
Figure 6:
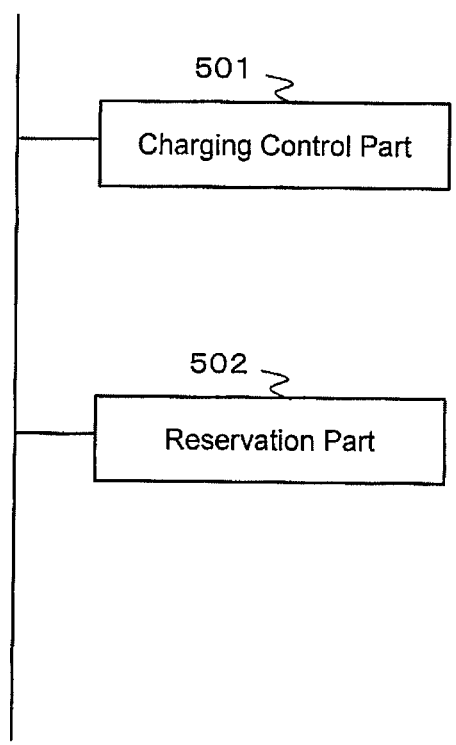
FIG. 6 is a diagram showing functional blocks of a battery charger according to an embodiment of the present invention.

Next, functional blocks of the navigation device 100 and the battery charger 300 according to the present embodiment will be described. FIG. 5 is a diagram showing functional blocks of the navigation device 100. And, FIG. 6 is a diagram showing functional blocks of the battery charger 300. Each functional block is realized when the CPU 2 or 303 mounted on the device 100 or 300 reads and executes a prescribed program. To that end, the ROM 4, 303 or the storage unit 11, 307 stores the program for executing the processing of each functional part.

Further, the functional blocks are classified according to the main contents of processing, in order to facilitate understanding of each function realized in the navigation device 100 or the battery charger 300. Further, the present invention is not limited by the way of classification of functions and by the names of functions. Each component function of the navigation device 100 and the battery charger 300 can be further classified into functions according to contents of processing. Or, it is possible to classify functions such that a component function performs more contents of processing.

Further, functional parts of each device can be realized by hardware (such as ASIC). Further, processing of each functional part can be executed by one piece of hardware or by pieces of hardware.

As shown in FIG. 5, the navigation device 100 comprises a general control part 401, a route search part 402, and a reservation information generation part 403.

The general control part 401 is a central functional part that performs various types of processing in the navigation device 100. In detail, the general control part 401 receives various kinds of information and various instructions from the other functional parts, the other devices and sensors contained in the navigation device 100, and external devices. Further, the general control part 401 outputs the obtained information and the received instructions to prescribed sensors, devices and functional parts according to kinds or contents of the information or the instructions.

Further, the general control part 401 performs graphics conversion of prescribed information such as the map information 12, and outputs the result to the display 10. Further, the general control part 401 guides the user to a way point and the destination by using the map information 12, route information and the like.

Further, the general control part 401 makes the display 10 display a prescribed input screen and reservation confirmation information, and receives input of information relating to reservation of charge from the user. Further, when the general control part 401 obtains update information that includes estimated time of arrival and an amount of charge from the reservation information generation part 403, the general control part 401 sends the update information to the battery charger 300 through the server 200.

The route search part 402 is a functional part that searches for a route connecting a departure place, a way point, and a destination. In detail, using prescribed information outputted from the GPS receiver 23, the vehicle sensor 21 and the gyro sensor 22 and the map information 12, the route search part 402 performs map matching processing to specify coordinate information that indicates the current location of the vehicle. Further, the route search part 402 receives addresses or names of a way point and a destination from the user, and specifies the corresponding coordinate information from the map information. Further, using the specified coordinate information, the route search part 402 generates route information on a route connecting the departure place and the destination by the Dijkstra's algorithm. Further, the route search part 402 outputs the generated route information to the general control part 401.

The reservation information generation part 403 is a functional part that generates reservation information for making a reservation of charging. In detail, the reservation information generation part 403 generates reservation information that includes prescribed pieces of information required for reservation of charging such as an appointment date, a stay length in the facility, an estimated time of arrival at the charging facility, and the like. At intervals of a prescribed time (for example, 5 minutes), the reservation information generation part 403 recalculates the estimated time of arrival at the charging facility and the amount of charge required for attaining full charge. If the result of the recalculation is different from the previous result of calculation, the reservation information generation part 403 generates update information that includes the newest calculation result, and outputs the update information to the general control part 401.

FIG. 6 is a diagram showing functional blocks of the battery charger 300. The battery charger 300 comprises a charging control part 501 and a reservation part 502.

The charging control part 501 is a central functional part that performs various types of processing in the battery charger 300. In detail, the charging control part 501 receives various kinds of information and various instructions from the other functional part, the other devices contained in the battery charger 300, and external devices. Further, the charging control part 501 outputs the obtained information and the received instructions to prescribed devices and functional parts according to kinds or contents of the information or the instructions.

Further, the charging control part 501 generates an instruction to switch the target of feeding, and outputs the instruction to the feeder unit 308. In detail, the charging control part 501 generates an instruction to supply power to a power cable α to which a booked vehicle is connected, according to the charge reservation schedule, and sends the instruction to the feeder unit 308.

The reservation part 502 is a functional part that makes a charge reservation for an electric vehicle. In detail, using information obtained from a navigation device 100, the reservation part 502 makes a charge reservation and a charge reservation schedule. Further, the reservation part 502 generates reservation confirmation information for confirming the content of a reservation. Further, the reservation part 502 makes a charge schedule that notifies a charge time and an amount of charge. The reservation part 502 performs rescheduling at a prescribed time point such as a time when a vehicle arrives or a time when update information is received from a navigation device 100, so that the charge schedule is made again.

Hereinabove, the functional blocks of the navigation device 100 and the battery charger 300 according to the present embodiment have been described.

[Operation]

Figure 7:
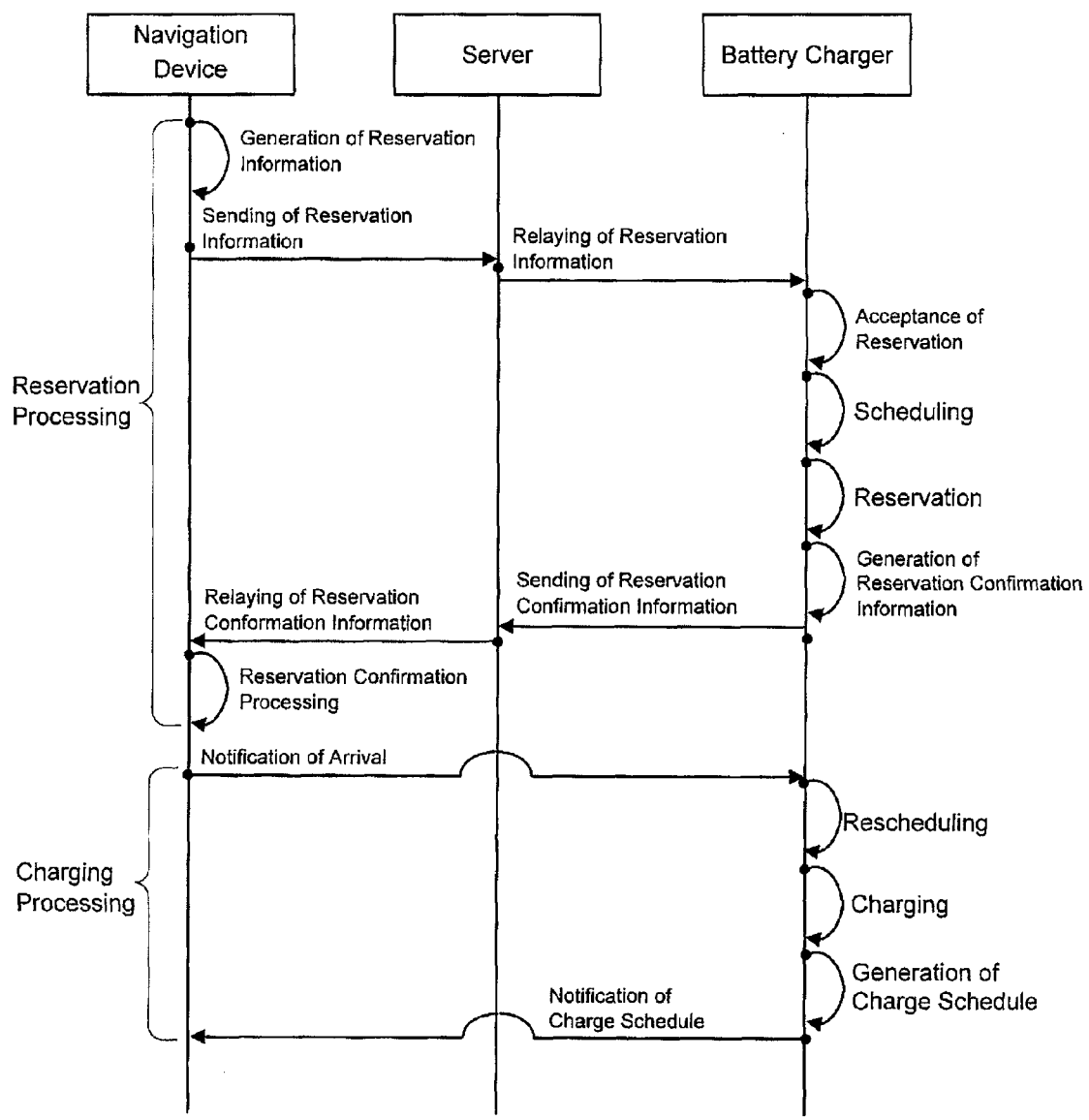
FIG. 7 is a sequence diagram showing an outline of reservation processing according to an embodiment of the present invention.

Next, flows of reservation processing and charging processing performed in the reservation system will be described. FIG. 7 is a sequence diagram showing a flow of the reservation processing. In the reservation processing, a navigation device 100 generates reservation information and sends the reservation information to the server 200. The server 200 relays the reservation information to the battery charger 300. Using the obtained reservation information, the battery charger 300 carries out the scheduling and reservation. Further, the battery charger 300 generates reservation confirmation information that includes prescribed pieces of information for reservation, and sends the reservation confirmation information to the navigation device 100 through the server 200.

Figure 8:
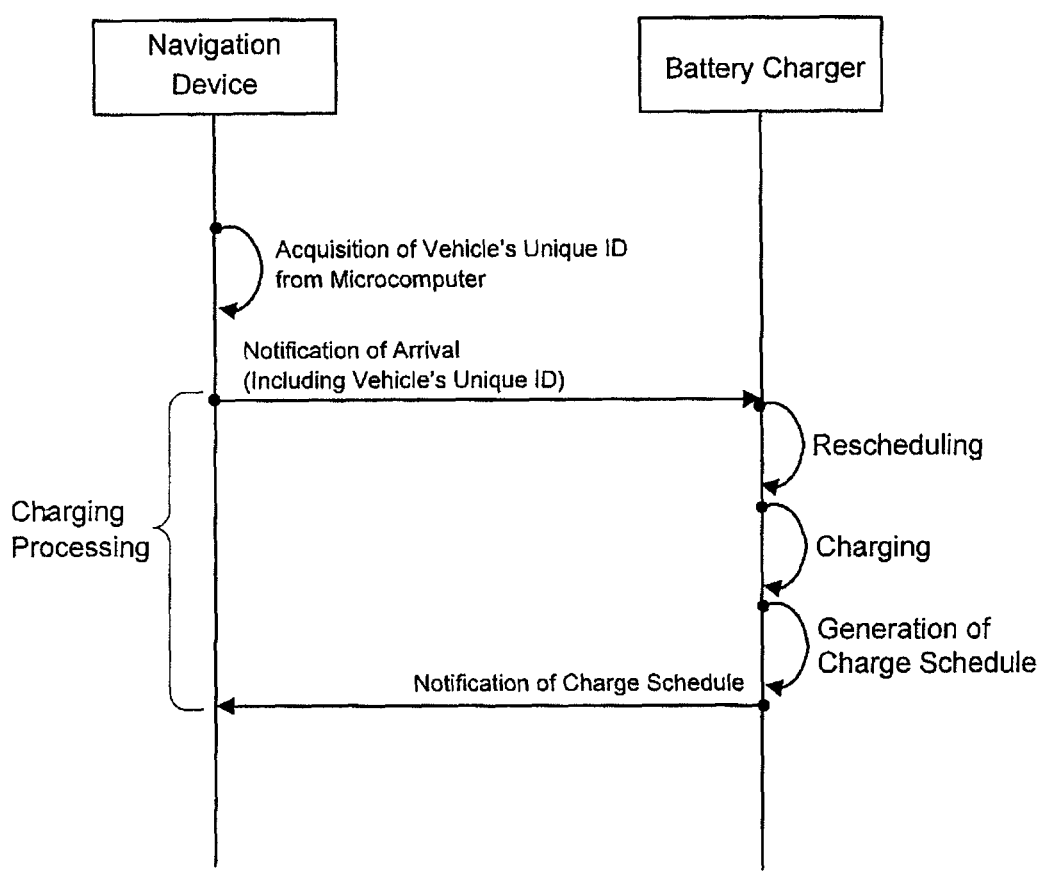
FIG. 8 is a sequence diagram showing an outline of charging processing according to an embodiment of the present invention.

Further, FIG. 8 is a sequence diagram showing a flow of the charging processing. In the charging processing, the navigation device 100 outputs an arrival notification, which indicates arrival, to the battery charger 300. Obtaining the arrival notification, the battery charger 300 performs rescheduling by using the already-made schedule. Further, according to the newly-made schedule, the battery charger 300 switches a booked vehicle as the target of feeding and performs charging. Further, the battery charger 300 makes a charge schedule for notifying the charge time and the amount of charge, and outputs the charge schedule to the navigation device 100.

According to the above-described flow, the reservation system performs the reservation processing and the charging processing.

Figure 9:
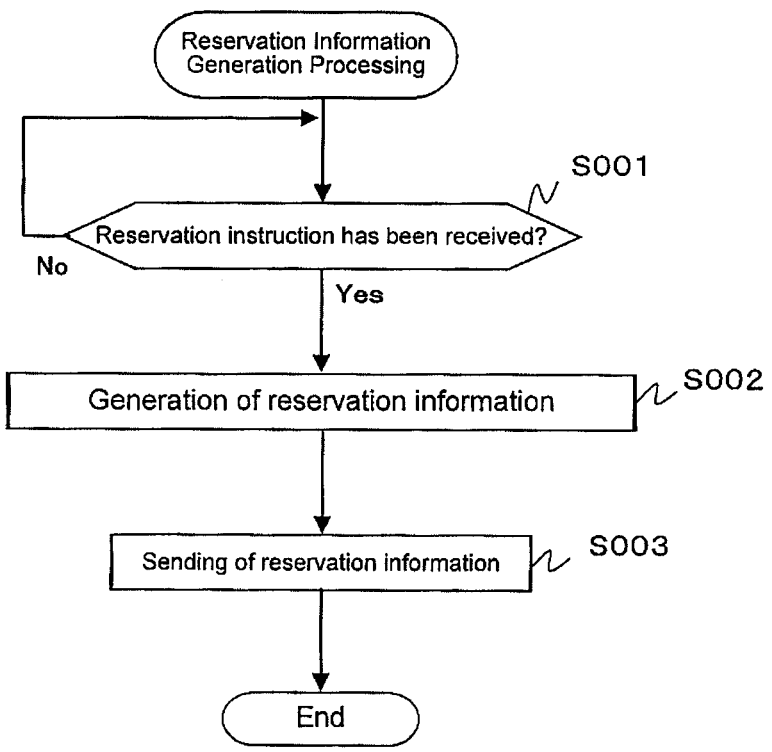
FIG. 9 is a flowchart showing reservation information generation processing according to an embodiment of the present invention.

First, reservation information generation processing in the reservation processing will be described in detail. FIG. 9 is a flowchart showing a flow of the reservation information generation processing performed in the navigation device 100. This processing is started when the navigation device 100 receives an instruction to shift into a charge reservation mode.

Figure 19:
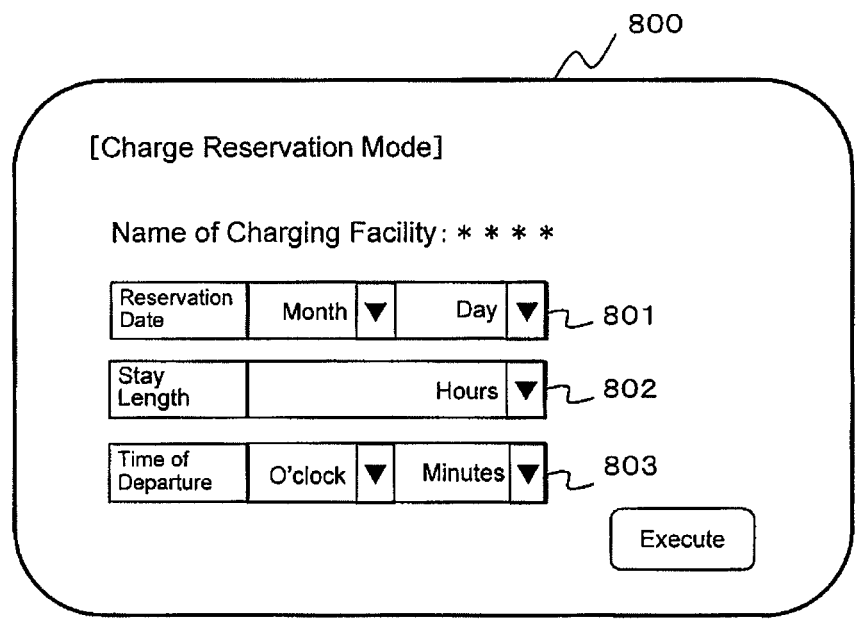
FIG. 19 is a view showing an example of a screen according to an embodiment of the present invention.

The general control part 401 makes the input screen 800 of FIG. 19 displayed, and awaits input of a reservation instruction (Step S001). When an appointment date (a date of charging) 801 and a stay length in the charging facility 802 (or a time of departing from the facility 803) are inputted, the general control part 401 judges that the reservation instruction has been received. It may be arranged that, if an appointment date (a date of charging) 801 is not inputted, the general control part 401 takes it as a reservation of the day.

Next, the reservation information generation part 403 generates reservation information (Step S002). In detail, the reservation information generation part 403 calculates the estimated time of arrival at the charging facility and the amount of charge required for attaining full charge. Here, the reservation information generation part 403 obtains the estimated time of arrival at the charging facility on the basis of the route information. Further, the reservation information generation part 403 generates reservation information that includes the estimated time of arrival, the amount of charge, the charge appointment date 801, and the stay length 802, and sends the reservation information to the server 200 through the radio communication unit 26 (Step S003).

Figure 10:
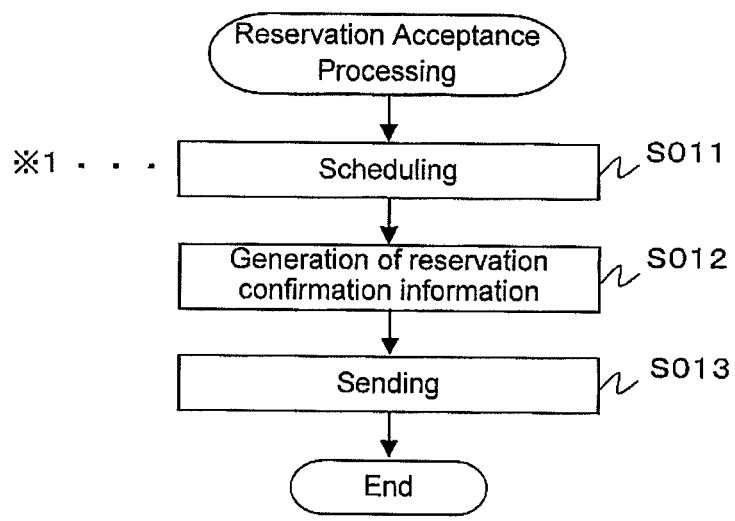
FIG. 10 is a flowchart showing reservation acceptance processing according to an embodiment of the present invention.

Next, reservation acceptance processing performed in the battery charger 300 will be described. Using reservation information obtained through the server 200, the battery charger 300 performs the reservation acceptance processing. FIG. 10 is a flowchart showing a flow of the reservation acceptance processing. This processing is started when the battery charger 300 obtains reservation information.

Figure 11:
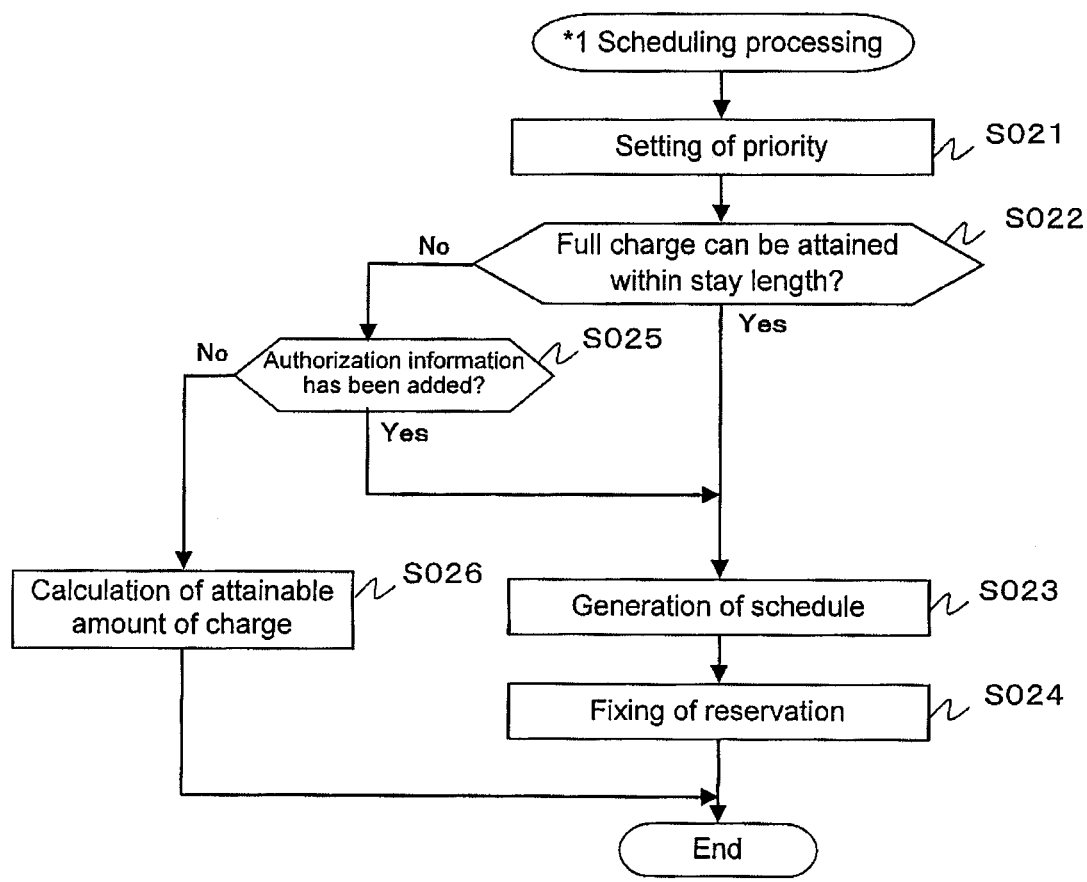
FIG. 11 is a flowchart showing scheduling processing according to an embodiment of the present invention.

Using the obtained reservation information, the reservation part 502 performs scheduling (Step S011). FIG. 11 is a flowchart showing details of scheduling processing. When the scheduling processing is started, the reservation part 502 sets priority (for example, priority 1, 2, 3, . . . , n) of the reservation (Step S021). In detail, the reservation part 502 fixes priority in the order reservation information is received. In the case, for example, where a plural items of reservation information for the same appointment date (date of charging) are obtained, the reservation part 502 sets a higher priority to an item of reservation information that has been obtained earlier.

Next, the reservation part 502 judges whether it is possible to attain full charge within the stay length in the charging facility (Step S022). In detail, the reservation part 502 calculates a charge time on the basis of the amount of charge required for attaining full charge included in the reservation information, and judges whether it is possible to secure the charge time required for attaining full charge in a time period in which another reservation does not exist within the stay length. In the case where it is possible to secure the charge time required for attaining full charge (Yes in Step S022), the reservation part 502 proceeds with the processing to Step S023. On the other hand, in the case of judging that full charge cannot be attained (No in Step, S022), the reservation part 502 proceeds with the processing to Step S025.

In Step S023, the reservation part 502 makes a schedule that assigns the charge time required for attaining full charge in the time period in which another reservation does not exists in the stay length, and fixes the reservation (Step S024). The reservation part 502 outputs the made schedule to the storage unit 307.

On the other hand, in Step S025, the reservation part 502 judges whether authorization information is added to the obtained reservation information. The authorization information is information added to reservation information when the user authorizes charging by a charge amount offered by the battery charger 300 if it is impossible to secure the charge time for attaining full charge within the say length. Details of the authorization information will be described later.

In the case where the authorization is added to the reservation information (Yes in Step S025), the reservation part 502 proceeds with the processing to Step S023 to make a schedule. On the other hand, in the case where the authorization is not added to the reservation information (No in Step S025), the reservation part 502 calculates a charge amount that can be attained in the stay length (Step S026). In detail, the reservation part 502 calculates a charge amount that can be attained on the basis of a charge time that can be secured in the stay length.

Returning to the flowchart of FIG. 10, the description will be continued. When the scheduling processing is finished, the reservation part 502 generates reservation confirmation information (Step S012). In detail, the reservation part 502 generates reservation confirmation information to notify existence or non-existence of fixed reservation, the appointed time, the amount of charge, and the like, and sends the reservation confirmation to the navigation device 100 (Step S013).

Figure 12:
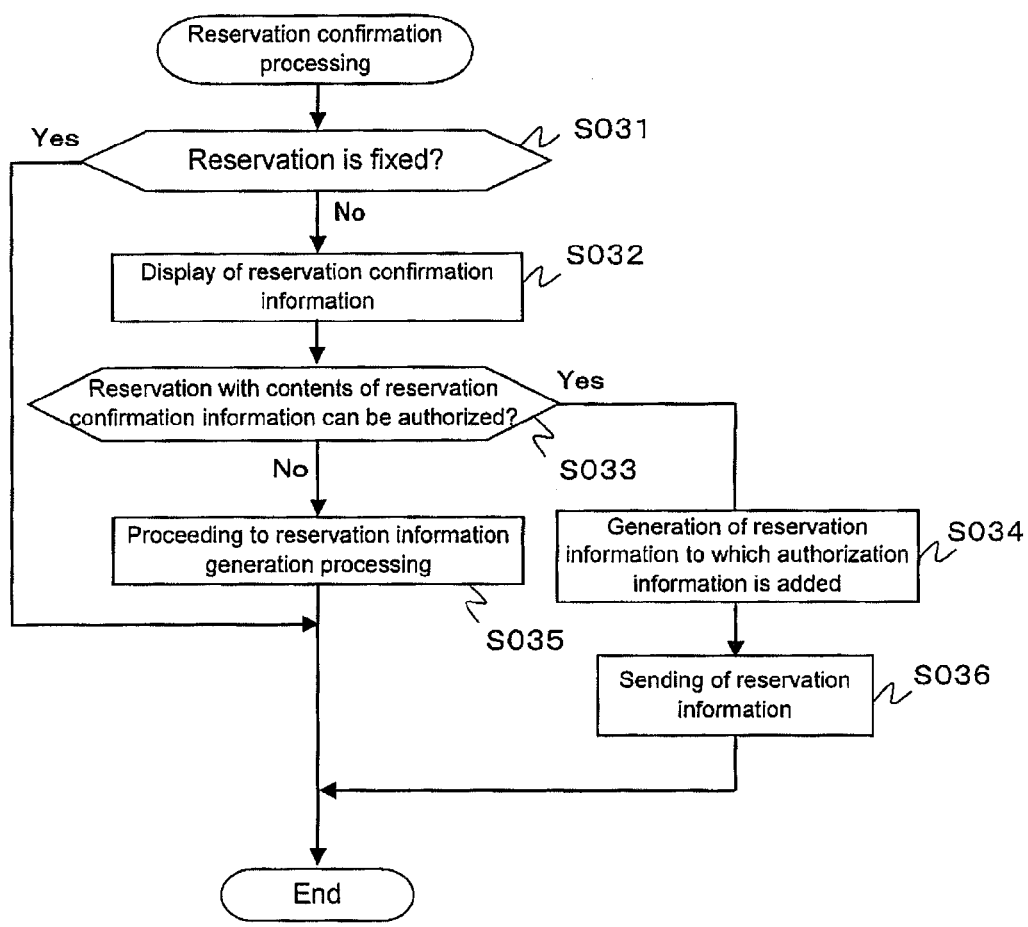
FIG. 12 is a flowchart showing reservation confirmation processing according to an embodiment of the present invention.

Next, reservation confirmation processing performed in a navigation device 100 will be described. FIG. 12 is a flowchart showing the reservation confirmation processing. This processing is started when a navigation device 100 receives reservation confirmation information.

When the reservation confirmation processing is started, the general control part 401 judges whether the reservation is fixed or not (Step S031). In detail, the general control part 401 judges whether the reservation is fixed or not on the basis of the reservation confirmation information. In the case where the reservation is fixed (Yes in Step S031), the general control part 401 ends the reservation confirmation processing. On the other hand, in the case where the reservation is not fixed (No in Step S031), the general control part 401 makes the reservation confirmation information displayed on the display 10 (Step S032).

Figure 20:
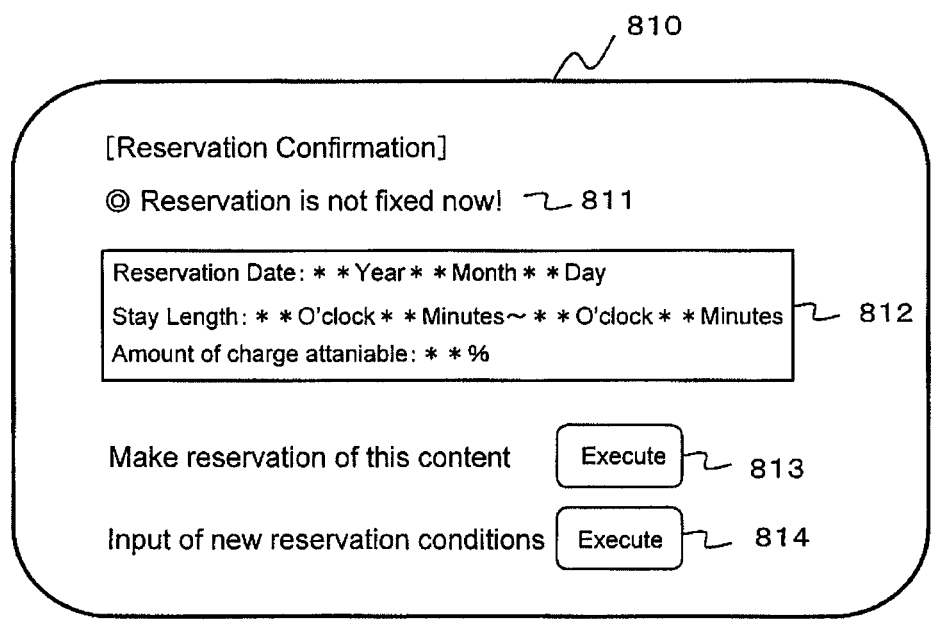
FIG. 20 is a view showing an example of a screen according to an embodiment of the present invention.

FIG. 20 is a view showing an example of a screen 810 displaying reservation confirmation information. In the example shown in the figure, the reservation confirmation information shows non-fixing of the reservation 811, information 812 such as the amount of charge attainable in the stay length, an instruction button 813 for making a reservation according to the displayed contents, and a button 814 for moving to a screen for inputting new reservation conditions.

Here, the general control part 401 judges whether a reservation instruction has been received according to the contents of the displayed reservation confirmation information (Step S033). In detail, the general control part 401 judges that the reservation instruction has been received when the button 813 is pushed (Yes in Step S033), and proceeds with the processing to Step S034. On the other hand, when the button 814 is pushed, the general control part 401 judges that the reservation instruction according to the contents of the reservation confirmation information has not been received (No in Step S033), and proceeds to the reservation information processing (Step S035) and ends this flow.

In Step S034, the reservation information generation part 403 generates reservation information having contents conforming to the conditions notified by the reservation confirmation information, and sends the reservation information to the battery charger 300 (Step S036). At that time, the reservation information generation part 403 adds the authorization information to the generated reservation information. That is to say, the authorization information is information that is added when the user authorizes charging by the offered amount of charge even if full charge cannot be attained in the stay length in the facility. Accordingly, the reservation part 502 of the battery charger 300 makes a schedule for charging the amount of charge notified by the reservation confirmation information even when full charge cannot be attained in the stay length in the facility (Step S023 of FIG. 11), and fixes the reservation (Step S024).

Hereinabove, the reservation information generation processing, the reservation acceptance processing and the reservation confirmation processing in the reservation processing have been described.

Next, the charging processing will be described. In the charging processing, arrival notification processing is performed first. The arrival notification processing is performed in a navigation device 100 when a power cable α of the battery charger 300 is connected to the cable connecting terminal of the navigation device 100. In detail, the general control part 401 outputs an acquisition request signal for obtaining the vehicle's unique ID to the microcomputer of the vehicle. Receiving the acquisition request signal, the microcomputer reads the vehicle's unique ID from a ROM mounted on the vehicle, and outputs the unique ID to the navigation device 100. The general control part 401 generates an arrival notification signal by adding the vehicle's unique ID to a prescribed signal for notifying arrival at the charging facility, and outputs the arrival notification signal to the battery charger 300 through the communication line.

Figure 13:
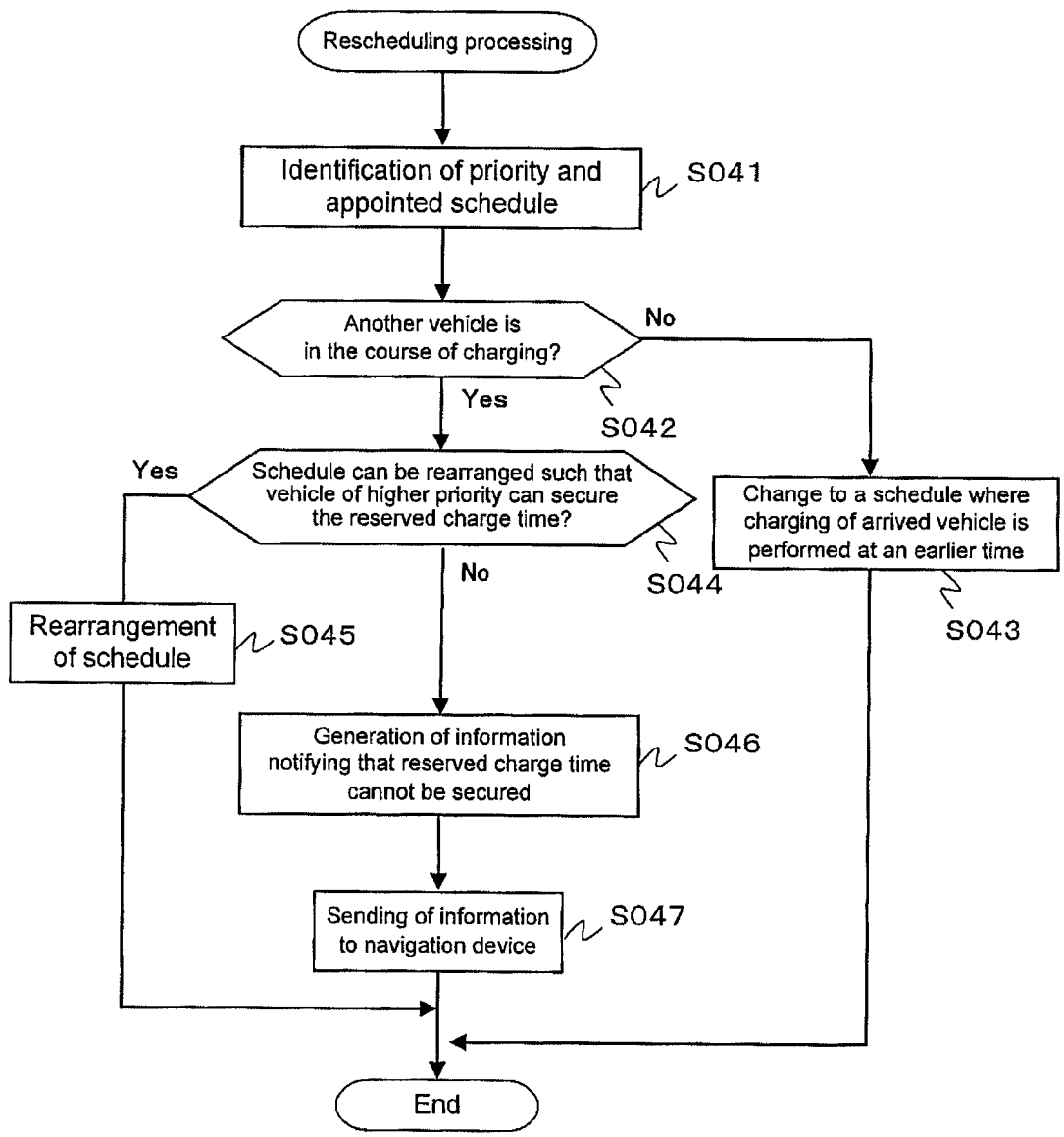
FIG. 13 is a flowchart showing rescheduling processing according to an embodiment of the present invention.

Receiving the arrival notification signal, the reservation part 502 of the battery charger 300 performs rescheduling processing. FIG. 13 is a flowchart showing the rescheduling processing. The reservation part 502 performs the rescheduling processing also when update information is received from a navigation device 100 through the server 200, i.e. when a vehicle's arrival time or an amount of charge required for attaining full charge is changed.

The reservation part 502 extracts the appointed schedule from the storage unit 307 on the basis of the vehicle's unique ID included in the arrival notification signal, and identifies the priority of the reservation (Step S041). Next, the reservation part 502 judges whether another booked vehicle is in the course of charging (Step S042). In detail, through the charging control part 501, the reservation part 502 judges whether another booked vehicle is in the course of charging. In the case where no booked vehicle is in the course of charging (No in Step S042), the reservation part 502 changes the current schedule to a schedule in which charging of the arrived booked vehicle is performed at an earlier time (Step S043).

On the other hand, in the case where another booked vehicle is in the course of charging (Yes in Step S042), the reservation part 502 judges whether the schedule can be rearranged into a schedule in which a vehicle of a higher priority can secure the reserved charge time (Step S044). That is to say, the reservation part 502 gives the first priority to ensuring the charge time reserved at the time of booking of the booked vehicle, and judges whether a rearranged schedule can assign a charge time of a booked vehicle of a lower priority to a vacant time in which no reservation exists.

Then, in the case where the schedule can be rearranged (Yes in Step S044), the reservation part 502 rearranges the schedule (Step S045), and ends the rescheduling processing.

On the other hand, in the case where such rearrangement of the schedule cannot be performed (No in Step S044), the reservation part 502 generates a message to the effect that the reserved charge time cannot be secured (for example, "The reserved charge time cannot be secured due to late arrival") (Step S046). Then, the reservation part 502 sends the generated message information to the navigation device 100 (Step S047), and ends the rescheduling processing. For example, this applies to the case where a booked vehicle arrives way late and the reserved charge time cannot be secured even by charging in the stay length. Obtaining the message information, the general control part 401 of the navigation device 100 makes a prescribed message displayed on the display 10.

Further, the reservation part 502 performs the rescheduling processing also when update information is received from a navigation device 100. In detail, the reservation part 502 identifies the appointed time and the reserved charge time of the vehicle in question by using the vehicle's unique ID in the received update information.

Then, in the case where the update information indicates a change of the estimated arrival time, the reservation part 502 changes the estimated arrival time of the booked vehicle.

Further, in the case where the update information indicates a change of the amount of charge, the reservation part 502 calculates a new charge time by using the amount of charge in the update information. Then, the reservation part 502 performs the rescheduling processing such that the calculated charge time can be secured. That is to say, in the case where the charge time calculated from the update information increases from the reserved charge time, the reservation part 502 rearranges the schedule so that the charge time can be secured. In the case where the charge time calculated from the update information decreases from the reserved charge time, the reservation part 502 changes the schedule to one that sets ahead the start times of charging of the vehicles booked after the reservation of the vehicle in question.

Figure 14:
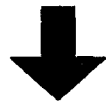
FIG. 14 is a diagram showing a reservation table and a schedule according to an embodiment of the present invention.

Here, the rescheduling processing will be described in detail. FIG. 14 is a diagram showing a reservation table 700 and a schedule 710. The reservation table 700 puts together prescribed items of reservation information received from vehicles A-C. Such a reservation table 700 is generated when the reservation part 502 of the battery charger 300 obtains reservation information, and is stored in the storage unit 307. As shown in the figure, the reservation table 700 stores a reservation ID 701, a reservation acceptance time 702, an estimated arrival time 703, a finish time 704, a charge time 705, and a priority 706. Here, the reservation ID stores a vehicle's unique ID indicating a booked vehicle. The reservation acceptance time 702 indicates a time when reservation information is received from the navigation device 100 of the vehicle in question. Further, the estimated arrival time 703 indicates an estimated time of arrival at the charging facility, which has been calculated by the navigation device 100. Further, the finish time 704 indicates a time that has been calculated from the arrival time and the stay length in the facility, i.e. a time of vehicle's departing from the facility.

The schedule 710 made in Step S023 stores a reservation ID 711, a reservation time 712, and a charge time 713. Based on the schedule 710 having such items, the reservation part 502 of the battery charger 300 performs the rescheduling processing each time when a booked vehicle arrives (or each time when update information is received).

First, when the booked vehicle C arrives (at 12:30) earlier than the estimated time, the reservation part 502 extracts the reservation table 700 and the schedule 710 from the storage unit 307, and identifies the priority (Step S041). Next, the reservation part 502 judges whether another booked vehicle than the booked vehicle C is in the course of charging (Step S042). Here, the booked vehicles A and B have not arrived yet (No in Step S042), and thus the reservation part 502 makes a schedule in which the schedule for the booked vehicle C is set ahead (Step S043).

Figure 15:
FIG. 15 is a diagram showing rescheduling of booked vehicles according to an embodiment of the present invention.

FIG. 15 is a diagram showing a rearranged schedule 720 at the time of arrival of the booked vehicle C. As shown in the figure, the reservation part 502 makes a rearranged schedule in which the reservation time 712 originally-set to 13:00-14:00 is set ahead to 12:30-13:30. Then, the charging control part 501 performs charging of the booked vehicle C according to the rearranged schedule.

Further, when the booked vehicle arrives (at 13:15) earlier than the estimated time, the reservation part 502 extracts the reservation table 700 and the schedule 720 from the storage unit 307, and identifies the priority (Step S041). Next, the reservation part 502 judges whether another booked vehicle than the booked vehicle B is in the course of charging (Step S042).

Here, at the arrival time of the booked vehicle B, the booked vehicle C is in the course of charging, and thus the reservation part 502 performs the processing of Step S044. In detail, the reservation part 502 judges whether it is possible to rearrange the schedule such that the booked vehicle B having the higher priority between the arrived booked vehicles B and C can secure the reserved charge time.

In judging, the reservation part 502 rearranges the schedule. For example, if charging of the booked vehicle B is performed in 13:30-15:15 after finish of charging of the booked vehicle C, the charge time reserved at the time of booking of the vehicle B having the higher priority can be secured and the booked vehicle C can also secure the charge time reserved at the time of booking. Accordingly, the reservation part 502 judges that the schedule can be rearranged (Yes in Step S044), and makes the rearranged schedule 730 shown in FIG. 16 (Step S045). Then, the charging control part 501 performs charging of the booked vehicle B according to this schedule.

Further, when the booked vehicle A arrives (at 14:45) later than the estimated time, the reservation part 502 extracts the reservation table 700 and the schedule 730 from the storage unit, and identifies the priority (Step S041). Next, the reservation part 502 judges whether another vehicle than the booked vehicle A is in the course of charging (Step S042).

Here, at the time of arrival of the booked vehicle A, the booked vehicle B is in the course of charging, and thus the reservation part 502 performs the processing in Step S044. In detail, the reservation part 502 judges whether it is possible to rearrange the schedule into one in which the booked vehicle A having the higher priority between the arrived booked vehicles A and B can secure the reserved charge time.

Figure 17:
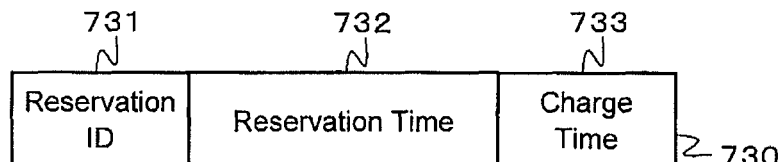
FIG. 17 is a diagram showing rescheduling of booked vehicles according to an embodiment of the present invention.
Figure 17:
Figure 17:
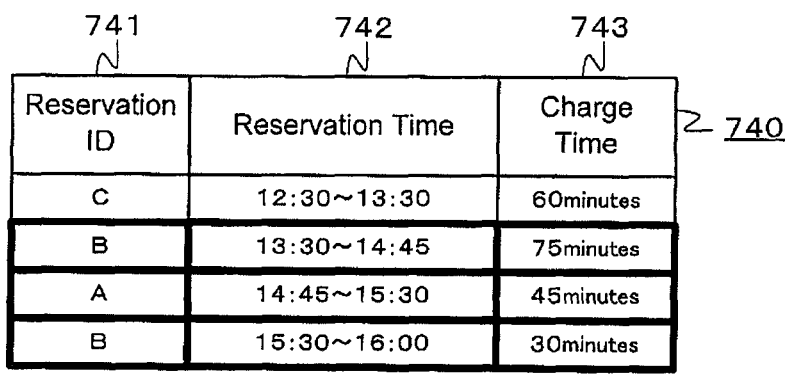

In judging, the reservation part 502 rearranges the schedule. For example, the charge time of the booked vehicle A cannot be secured after 15:15 when charging of the booked vehicle B is finished. On the other hand, if charging of the booked vehicle B is performed in 15:30-16:00 after charging of the booked vehicle A is performed in 14:45-15:30, the charge time of the booked vehicle A having the higher priority and the charge time of the booked vehicle B can be both secured. Thus, the reservation part 502 judges that such rearrangement of the schedule is possible (Yes in Step S044), and makes the schedule 740 shown in FIG. 17 (Step S045). Then, the charging control part 501 performs charging of the booked vehicles A and B according to this schedule.

Next, the reservation part 502 makes a charge schedule that notifies the charge time and the amount of charge, and outputs the charge schedule to the navigation device 100 concerned. In the case where the charge time reserved at the time of booking cannot be secured, the reservation part 502 outputs a charge schedule that includes a generated prescribed message to the navigation device 100 concerned.

According to the above-described reservation system, it is possible to provide easily-comprehensible information on charging. In particular, if no other vehicle is in the course of charging, charging is performed without respect to priority of reservation, realizing efficient charging. On the other hand, even if a vehicle arrives late, a charge schedule is made in accordance with the priorities, and it is possible to perform charging without causing a sense of unfairness.

The present invention is not limited to the above-described embodiment. According to a second embodiment of the present invention, processing of lowering the priority of a reservation is performed if reservation of charging is made with respect to a plurality of way points. In the case where reservations of charging are made with respect to a plurality of way points, even if a large amount of charge time is not secured as for a battery charger 300 at one location, charging may be possible at another way point. Thus, according to the reservation system of the second embodiment, lowering of the priority of such a reservation can improve efficiency of charging of other booked vehicles.

Figure 21:
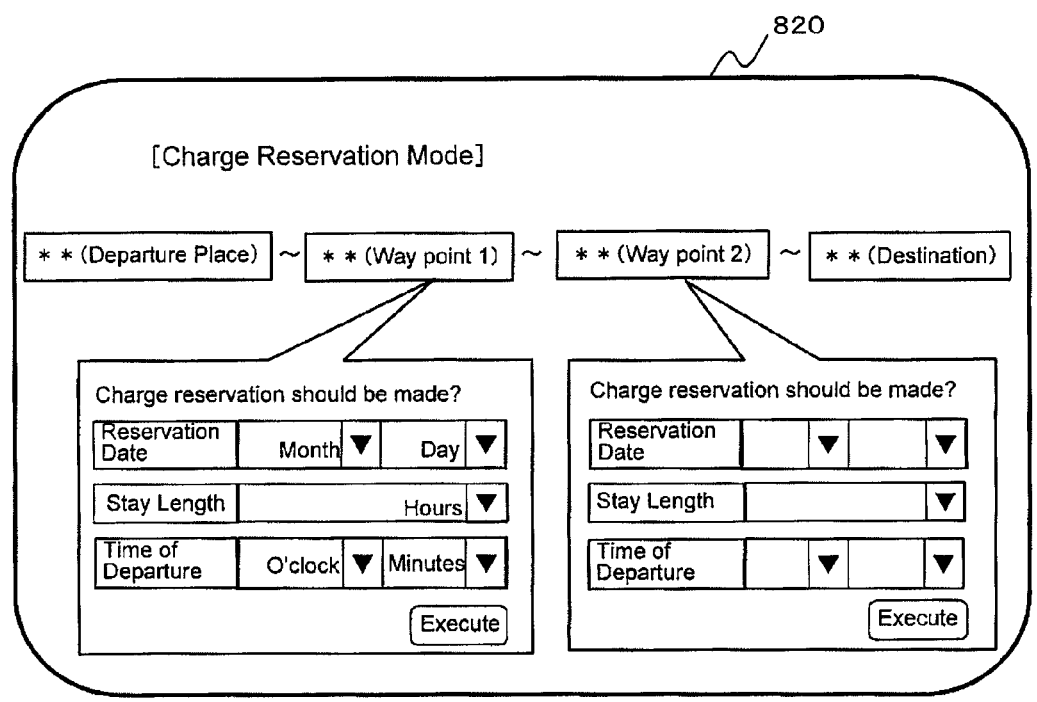
FIG. 21 is a view showing an example of a screen according to another embodiment of the present invention.

For example, the general control part 401 makes the input screen 820 shown in FIG. 21 displayed in order to receive a reservation of charging. Further, the reservation information generation part 403 adds, to the reservation information, information indicating that a plurality of reservations are inputted, and sends the resultant information to the battery charger 300.

Figure 18:
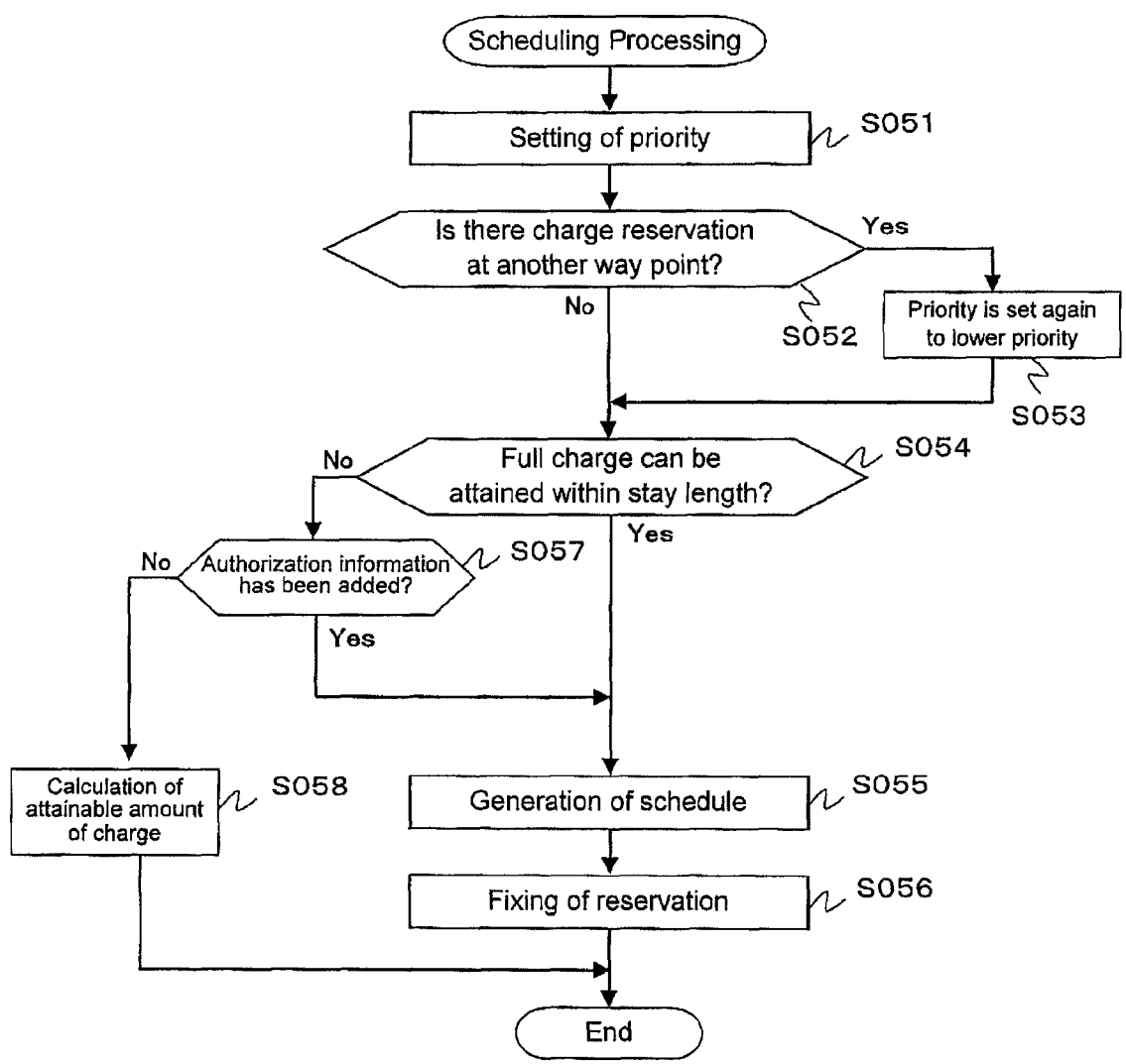
FIG. 18 is a flowchart showing scheduling processing according to another embodiment of the present invention.

Receiving such reservation information, the battery charger 300 performs the scheduling processing shown in FIG. 18. As shown in the figure, the reservation part 502, which obtains the reservation information, sets priority of the reservation (Step S051), and judges whether a charge reservation for another way point has been made (Step S052). In detail, the reservation part 502 judges whether information indicating input of a plurality of reservations is added to the reservation information. If such information is added (Yes in Step S052), the reservation part 502 sets the already-set priority to a lower priority than the priorities of the other reservations (Step S053), and proceeds with the processing to Step S054. The processing in Steps S054-S058 is similar to the processing in Steps S023-S026 in FIG. 11, and description of the processing will be omitted.

According to the above-described reservation system, it is possible to provide easily-comprehensible information on charging. In particular, even if a large amount of charge time is not secured as for a battery charger at one location, charging may be possible at another way point, in the case where charge reservations are made with respect to a plurality of way points. Thus, in the reservation system according to the second embodiment, lowering of the priority of such a reservation can improve efficiency of charging of other booked vehicles.

In the above-described embodiments, the battery charger 300 performs the scheduling processing and the rescheduling processing. However, the present invention is not limited to these embodiments. For example, as a variant of the above embodiments, the server 200 in the communication center can perform the scheduling processing and the rescheduling processing. Here, the serve 200 performs the rescheduling processing when the server 200 receives, from the battery charger 300, an arrival notification that notifies an arrival time of a booked vehicle. Further, the battery charger 300 performs charging according to a schedule made by the server 200.

Also by the embodiment of such a variant according to the invention, it is possible to provide easily-comprehensible information on charging.

The invention claimed is:

1. A reservation system, wherein:
the reservation system comprises a navigation device and a battery charger;
the navigation device generates reservation information of a charge and sends the reservation information to the battery charger;
the battery charger makes a schedule by using the reservation information, and performs charging according to the schedule;
the battery charger makes again a schedule according to an arrival time of a booked vehicle; and
the battery charger:
sets a higher priority in order reservation information is obtained;
changes the schedule to a schedule in which a charge start time appointed at a time of booking is set ahead if another booked vehicle is not in course of charging, when a booked vehicle arrives earlier than an appointed time; and
changes the schedule to a schedule in which a charge time reserved for a booked vehicle of a higher priority can be secured, when a booked vehicle arrives later than an appointed time.

2. A reservation system of claim 1, wherein:
the battery charger sends a prescribed message to the navigation device of a booked vehicle if the reserved charge time cannot be secured because the booked vehicle arrives later than the appointed time.

3. A reservation system, wherein:
the reservation system comprises a navigation device and a battery charger;
the navigation device generates reservation information of a charge and sends the reservation information to the battery charger;
the battery charger makes a schedule by using the reservation information, and performs charging according to the schedule;
the battery charger makes again a schedule according to an arrival time of a booked vehicle; and
when the reservation information obtained by the battery charger makes charge reservations with a plurality of battery chargers, the reservation in question is set to a lower priority than priorities of other reservations.

4. A reservation system, wherein:
the reservation system comprises a navigation device, a server and a battery charger;
the navigation device generates reservation information of a charge and sends the reservation information to the battery charger;
the server makes a schedule by using the reservation information and sends the schedule to the battery charger;

the battery charger performs charging according to the schedule;

further, the battery charger notifies an arrival time of a booked vehicle to the server;

the server makes again a schedule according to the arrival time of the booked vehicle; and the server:
- sets a higher priority in order reservation information is obtained;
- changes the schedule to a schedule in which a charge start time appointed at a time of booking is set ahead if another booked vehicle is not in course of charging, when a booked vehicle arrives earlier than an appointed time; and
- changes the schedule to a schedule in which a charge time reserved for a booked vehicle of a higher priority can be secured, when a booked vehicle arrives later than an appointed time.

5. A battery charger, comprising:

an information acquisition part, which acquires reservation information of a charge from a navigation device;

a scheduling part, which makes a schedule by using the reservation information;

a rescheduling part, which makes again a schedule according to an arrival time of a booked vehicle; and a charging part, which performs charging of a predetermined booked vehicle according to the schedule made by the rescheduling part, wherein:

the scheduling part sets a higher priority in order reservation information is obtained; and the rescheduling part:
- changes the schedule to a schedule in which a charge start time appointed at a time of booking is set ahead if another booked vehicle is not in course of charging, when a booked vehicle arrives earlier than an appointed time; and
- changes the schedule to a schedule in which a charge time reserved for a booked vehicle of a higher priority can be secured, when a booked vehicle arrives later than an appointed time.

6. A battery charger of claim 5, further comprises:

a message generation part, which generates a message when a reserved charge time cannot be secured because a booked vehicle arrives later than an appointed time; and a sending part, which sends the message to the navigation device of the booked vehicle.

7. A battery charger, comprising:

an information acquisition part, which acquires reservation information of a charge from a navigation device;

a scheduling part, which makes a schedule by using the reservation information;

a rescheduling part, which makes again a schedule according to an arrival time of a booked vehicle; and a charging part, which performs charging of a predetermined booked vehicle according to the schedule made by the rescheduling part;

a receiving part, which periodically receives update information including an amount of charge required for attaining full charge from a booked vehicle; and a calculation part, which calculates a charge time from the amount of charge; wherein:

when a newest charge time calculated from the amount of charge in the update information is longer than a reserved charge time, the rescheduling part changes the schedule to a schedule in which the newest charge time can be secured; and when the newest charge time is shorter than the reserved charge time, the rescheduling part changes the schedule to a schedule in which charge start times of booked vehicles later than a reservation for the vehicle are set ahead.

8. A battery charger, comprising:

an information acquisition part, which acquires reservation information of a charge from a navigation device;

a scheduling part, which makes a schedule by using the reservation information;

a rescheduling part, which makes again a schedule according to an arrival time of a booked vehicle; and a charging part, which performs charging of a predetermined booked vehicle according to the schedule made by the rescheduling part;

wherein when the reservation information obtained by the scheduling part makes charge reservations with a plurality of battery chargers, the scheduling part sets the reservation in question to a lower priority than priorities of other reservations.

* * * * *